United States Patent
Yu et al.

(10) Patent No.: US 8,411,161 B2
(45) Date of Patent: Apr. 2, 2013

(54) APPARATUS FOR AUTOMATIC ESTIMATE OF THE ANGLE IN TILTED IMAGES FOR LEVEL CORRECTION

(75) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 12/897,537

(22) Filed: Oct. 4, 2010

(65) Prior Publication Data

US 2012/0081572 A1    Apr. 5, 2012

(51) Int. Cl.
*H04N 5/225*    (2006.01)
*G06K 9/32*    (2006.01)
*G06K 9/50*    (2006.01)

(52) U.S. Cl. .................. 348/222.1; 382/289; 382/296

(58) Field of Classification Search .................. 382/289, 382/290, 296
See application file for complete search history.

(56) References Cited

U.S. PATENT DOCUMENTS

| | | | |
|---|---|---|---|
| 2008/0018941 A1* | 1/2008 | Taylor | 358/3.27 |
| 2008/0199082 A1* | 8/2008 | Tanaka et al. | 382/199 |
| 2010/0054595 A1* | 3/2010 | Demandolx et al. | 382/296 |
| 2010/0172598 A1* | 7/2010 | Kimura | 382/296 |
| 2011/0228342 A1* | 9/2011 | Dolan | 358/3.26 |

* cited by examiner

*Primary Examiner* — Jason Whipkey
(74) *Attorney, Agent, or Firm* — Haverstock & Owens LLP (57) ABSTRACT

A method of and an apparatus for automatically estimating the tilting angle in tilted images enables level correction of the images. A preferred orientation of objects in an image and the deviation of the current orientation from the preferred orientation is determined by tilt image analysis without object recognition. Tilt image analysis includes several steps such as gradient feature computation, line segment tracking, line segment estimation and orientation deviation estimation. Once the tilt angle is determined, the image can be corrected so that an object or scene is not tilted or is tilted by only the appropriate amount.

33 Claims, 3 Drawing Sheets

APPARATUS FOR AUTOMATIC ESTIMATE OF THE ANGLE IN TILTED IMAGES FOR LEVEL CORRECTION

FIELD OF THE INVENTION

The present invention relates to the field of image processing. More specifically, the present invention relates to level correction in tilted images.

BACKGROUND OF THE INVENTION

Digital cameras have been used to acquire images for many years. Digital cameras typically record captured images in a particular format on a storage device. The stored images are able to be processed or modified by a user.

Some types of digital cameras include built in orientation sensors. An orientation sensor is used to determine if the user has the camera in regular landscape mode or if the camera has been rotated to take a picture in the portrait mode. The inclusion of the orientation sensor allows the images to be displayed on a display in the correct orientation.

In spite of orientation sensors, it is common to acquire an image with a camera tilted to an angle. In some circumstances, it is beneficial to correct the tilt/angle so that the image appears untilted. One implementation of tilt correction involves identifying vertical or horizontal objects within an image and determining the orientation error associated with the objects and rotating the image to eliminate the orientation error.

SUMMARY OF THE INVENTION

A method of and apparatus for automatically estimating the angle in tilted images enables level correction of the images. A preferred orientation of an object and the deviation of the current orientation from the preferred orientation is determined by tilt image analysis without object recognition. Tilt image analysis includes several steps such as gradient feature computation, line segment tracking, line segment estimation and orientation deviation estimation. Once the tilt angle is determined, the image is corrected so that an object or scene is not visibly tilted or is tilted by the appropriate amount.

In one aspect, a method of estimating a tilt angle in an image programmed in a memory on a device comprises computing a gradient feature, implementing line segment tracking, estimating a line segment and estimating an orientation deviation. The method further comprises reversely tilting the image based on the orientation deviation. Computing the gradient feature further comprises estimating a gradient, adaptive noise filtering, non-maximum suppression and thinning. Implementing line segment tracking further comprises locating segment junctions using a neighborhood look-up table and tracking edges between junction points. Tracking edges between junction points further comprises scanning a gradient image starting at a non-zero point, following an edge segment through its neighborhood, stopping tracking at a junction, assigning each segment a unique identification, iterating until all of the points are tracked and removing any edge segment that is short or isolated. Estimating the line segment further comprises filtering edge length and estimating linear segments from approximately vertical and horizontal lines. Estimating the orientation deviation further comprises computing an optimal balance between deviations from all line segments. Estimating the orientation deviation further comprises image content analysis and segment analysis. Image content analysis further comprises filtering segments according to location in the image. Segment analysis uses vertical segments if more than one vertical segment is present; otherwise, horizontal segments are used if more than one horizontal segment is present and the total length is more than the total vertical length; otherwise, the average of the vertical and horizontal segment length is used. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of estimating a tilt in an image programmed in a memory on a device comprises implementing linear structure estimation for estimating orientation preference and changing an orientation of the image based on the linear structure estimation. Implementing linear structure estimation further comprises computing a gradient feature, implementing line segment tracking, estimating a line segment and estimating an orientation deviation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system programmed in a memory on a device comprises a gradient feature module configured for computing a gradient feature, a line segment tracking module operatively coupled to the gradient feature module, the line segment tracking module configured for implementing line segment tracking, a line segment estimating module operatively coupled to the line segment tracking module, the line segment estimating module configured for estimating a line segment, an orientation deviation module operatively coupled to the line segment estimating module, the orientation deviation module configured for estimating an orientation deviation and a tilting module operatively coupled to the orientation deviation module, the tilting module configured for tilting an image based on the orientation deviation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for computing a gradient feature, implementing line segment tracking, estimating a line segment and estimating an orientation deviation and a processing component coupled to the memory, the processing component configured for processing the application. The device further comprises tilting the image based on the orientation deviation. Computing the gradient feature further comprises estimating a gradient, adaptive noise filtering, non-maximum suppression and thinning. Implementing line segment tracking further comprises locating segment junctions using a neighborhood look-up table and tracking edges between junction points. Tracking edges between junction points further comprises scanning a gradient image starting at an edge point, following an edge segment through its neighborhood, stopping tracking at a junction, assigning each segment a unique identification, iterating until all of the points are tracked and removing any edge segment that is short or isolated. Estimating the line segment further comprises filtering edge length and estimating linear segments from approximately vertical and horizontal lines. Estimating the orientation deviation further comprises computing an optimal balance between deviations from all line segments. Estimating the orientation deviation further comprises image content analysis and segment analysis. Image content analysis further comprises filtering segments according to location in the image. Segment analysis uses vertical segments if more than one vertical segment is present; otherwise, horizontal segments are used if more than one horizontal segment is present and the total length is more than the total vertical length; otherwise, the average of the vertical and horizontal segment length is used. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In yet another embodiment, a camera comprises a lens, a sensor configured for acquiring an image through the lens, a memory for storing an application, the application configured for computing a gradient feature, implementing line segment tracking, estimating a line segment and estimating an orientation deviation and a processing component coupled to the memory, the processing component configured for processing the application. The device further comprises tilting the image based on the orientation deviation. Computing the gradient feature further comprises estimating a gradient, adaptive noise filtering, non-maximum suppression and thinning. Implementing line segment tracking further comprises locating segment junctions using a neighborhood look-up table and tracking edges between junction points. Tracking edges between junction points further comprises scanning a gradient image starting at an edge point, following an edge segment through its neighborhood, stopping tracking at a junction, assigning each segment a unique identification, iterating until all of the points are tracked and removing any edge segment that is short or isolated. Estimating the line segment further comprises filtering edge length and estimating linear segments from approximately vertical and horizontal lines. Estimating the orientation deviation further comprises computing an optimal balance between deviations from all line segments. Estimating the orientation deviation further comprises image content analysis and segment analysis. Image content analysis further comprises filtering segments according to location in the image. Segment analysis uses vertical segments if more than one vertical segment is present; otherwise, horizontal segments are used if more than one horizontal segment is present and the total length is more than the total vertical length; otherwise, the average of the vertical and horizontal segment length is used.

DETAILED DESCRIPTION OF THE PREFERRED EMBODIMENT

A preferred orientation of an object and the deviation of the current orientation from the preferred orientation is to be determined by tilt image analysis without object recognition. Tilt image analysis includes several steps such as gradient feature computation, line segment tracking, line segment estimation and orientation deviation estimation.

Figure 1:
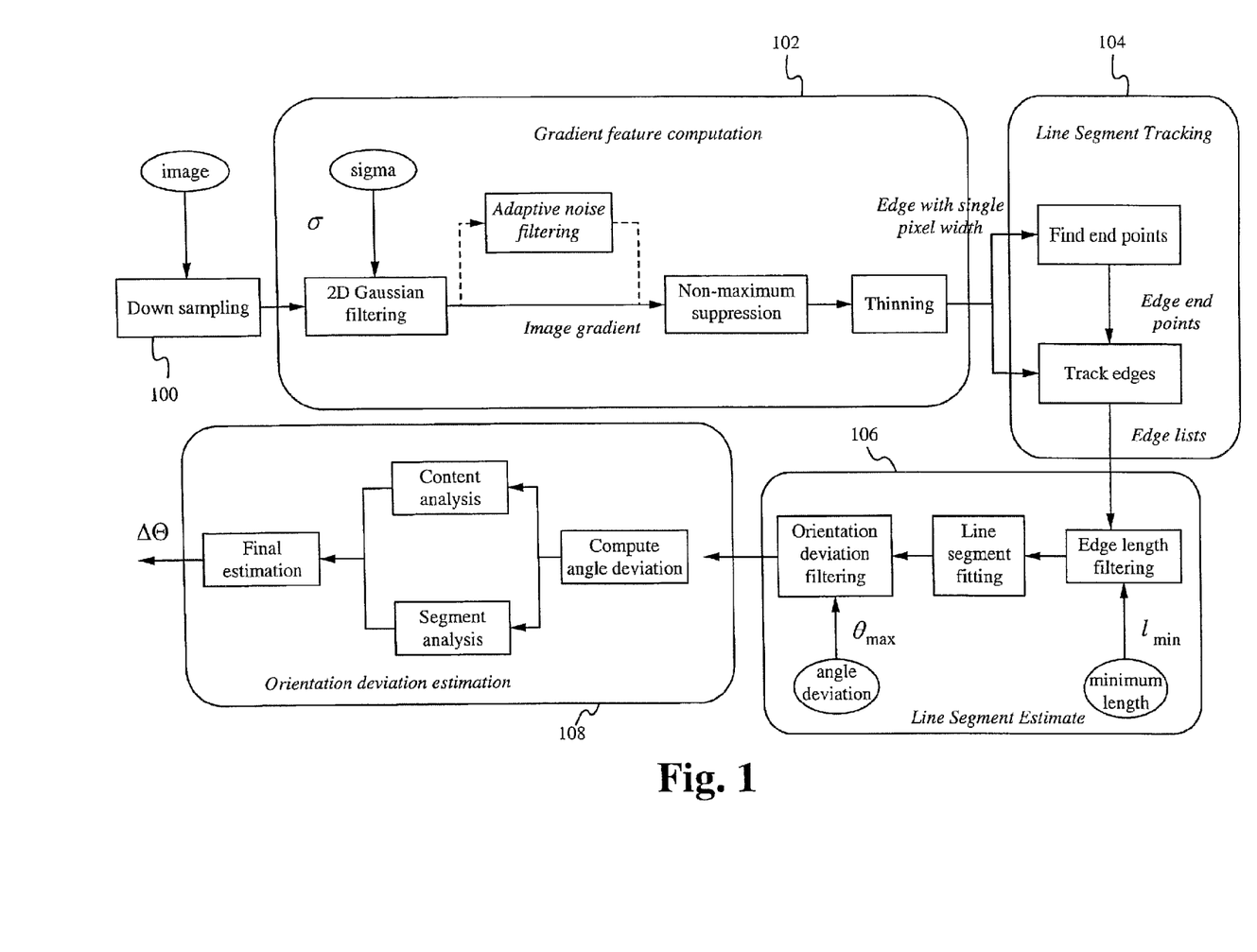
FIG. 1 illustrates a flowchart of a method of estimating a tilt angle of an image according to some embodiments.

FIG. 1 illustrates a flowchart of a method of estimating a tilt angle of an image. In the step 100, the image is down sampled. In some embodiments, down sampling brings the image to a maximum of 600 pixels in either length or width using bicubic interpolation. In some embodiments, a different method of down sampling is implemented. In some embodiments, a different number of maximum pixels is implemented. In some embodiments, the step 100 is skipped, and down sampling is not implemented.

In the step 102, a gradient feature is computed. Computing the gradient feature includes gradient estimation, adaptive noise filtering, non-maximum suppression and thinning. In the gradient estimation a directional derivative of a Guassian is first computed.

$$\left[\frac{\partial G_\sigma}{\partial x}, \frac{\partial G_\sigma}{\partial y}\right], G_\sigma = \frac{1}{\sqrt{2\pi}\,\sigma} e^{-(x^2+y^2)/2\sigma^2}$$

The gradient magnitude is computed by:

$$I_g(x, y) = \left[\left(\frac{\partial G_\sigma}{\partial x} * I\right)^2 + \left(\frac{\partial G_\sigma}{\partial y} * I\right)^2\right]^{1/2}$$

In some embodiments, an edge gradient is filtered by adaptive noise filtering.

The image gradient is further processed by non-maximum suppression. Non-maximum suppression is applied to suppress a pixel whose gradient is not locally a maximum:

$$I_g(x, y) = \begin{cases} I_g(x, y) & \text{if } I_g(x, y) > I_g(x', y') \\ & \& \ I_g(x, y) > I_g(x'', y'') \\ 0 & \text{otherwise} \end{cases}$$

A pixel is labeled an "edge" if its gradient is above a high threshold. The pixel is labeled as a "non-edge" if its gradient is below a low threshold. For a pixel between the high and low thresholds, the pixel is labeled an "edge" if it is connected with an "edge" pixel.

Thinning is also implemented to estimate a single pixel width from double or triple maximum edge points. After thinning, the edge with a single pixel width is used in the next step.

In the step 104, line segment tracking is implemented. Line segment tracking includes locating segment junctions by a neighborhood look-up table algorithm. Line segment tracking also includes tracking edges between junction points including scanning a gradient image starting at a non-zero edge point, following an edge segment through its neighborhood, stop tracking at the junction, assigning each segment a unique identification, iterating until all of the points are tracked and removing any edge segment that is short or isolated. Resulting edge lists are used in the next step.

In the step 106, a line segment is estimated. Estimating the line segment includes edge length filtering using Euclidean 2-norm. Estimating the line segment also includes estimating linear segments from approximately vertical and horizontal lines by filtering a minimum length ($l>l_{min}$), fitting by straight line segments and considering only lines close to vertical or horizontal orientation ($\theta<\theta_{max}$).

In some embodiments, line segment estimation includes a two-scale method with higher precision but increased complexity. The two-scale method includes edge gradient detection with statistical noise filtering at two levels. At the first level (or level 0), short line segments are identified. At the second level (or level 1), long line segments are searched, cued by the short segments. The orientation deviation is then computed at level 1.

In the step 108, orientation deviation is estimated using the line segments. Orientation deviation estimation includes computing angle deviation where:

$$\delta\theta_i = \begin{cases} \theta_i - \varphi, & |\theta_i - \varphi| \le \theta_{max} \\ 0, & |\theta_i| > \theta_{max} \end{cases}, \varphi = 0, \pi/2$$

The optimal balance is able to be computed from the line segments determined in the step 106.

$$\Delta\Theta_{0,\pi/2} = \sum_i w_i \delta\theta_i, \quad w_i = \frac{l_i}{\sum_i l_i}$$

Image content analysis filters segments according to their locations in the image. Segments within "ignored" zones along an image boundary do not contribute to the final estimation. Segment analysis uses vertical segments if more than one vertical segment is present. Otherwise, horizontal segments are used if more than one horizontal segment is present and their total length is more than the total vertical length. Otherwise, the average of the vertical and horizontal segment length is used.

View parameters $\Delta\Theta$ are estimated from the optimal linear balance:

$$\Delta\Theta = f(d_0, d_{\pi/2}) = \beta_0 \Delta\Theta_0 + \beta_{\pi/2} \Delta\Theta_{\pi/2}$$

where $\beta_0$, $\beta_{\pi/2}$ are determined by the image content analysis and segment analysis. In some embodiments, after the view parameters are estimated, the image is rotated by the amount of the orientation deviation so that the tilt is removed.

Figure 2:
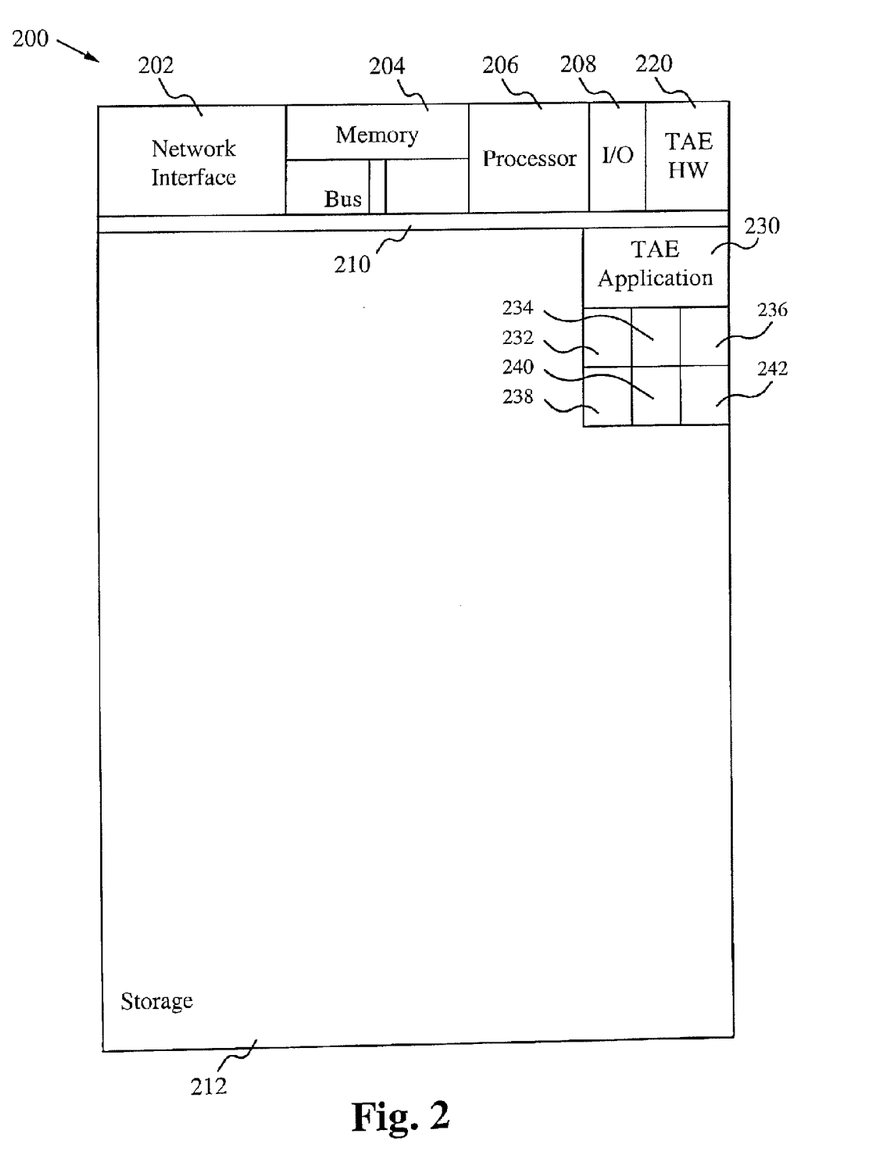
FIG. 2 illustrates a block diagram of an exemplary computing device configured to implement tilt angle estimation according to some embodiments.

FIG. 2 illustrates a block diagram of an exemplary computing device 200 configured to implement tilt angle estimation according to some embodiments. The computing device 200 is able to be used to acquire, store, compute, communicate and/or display information such as images and videos. For example, a computing device 200 is able to acquire and store an image. The tilt angle estimation method is able to be used to estimate a tilt angle in an image and correct the tilt of the image on the device 200. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Tilt angle estimation application(s) 230 used to perform the tilt angle estimation method are likely to be stored in the storage device 212 and memory 204 and processed as applications are typically processed. More or less components shown in FIG. 2 are able to be included in the computing device 200. In some embodiments, tilt angle estimation hardware 220 is included. Although the computing device 200 in FIG. 2 includes applications 230 and hardware 220 for tilt angle estimation, the tilt angle estimation method is able to be implemented on a computing device in hardware, firmware, software or any combination thereof.

In some embodiments, the tilt angle estimation application(s) 230 include several applications and/or modules. A gradient feature module 232 is configured for computing a gradient feature. A line segment tracking module 234 is configured for implementing line segment tracking. A line segment estimating module 236 is configured for estimating a line segment. An orientation deviation module 238 is configured for estimating an orientation deviation. A tilt correction module 240 is configured for tilting an image based on the orientation deviation. A planar inference module 242 is configured for implementing planar structure estimation. Fewer or additional modules are able to be included as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

A specific example of a computing device implementing tilt angle estimation is a camera which includes a lens, a sensor such as a Charge-Coupled Device (CCD) or Complementary Metal Oxide Semiconductor (CMOS), a storage component such as a hard drive or a flash memory, a processing component and other standard image acquisition components. The camera functions as any other camera, for example, when a user presses a button to acquire an image, the lens, sensor and processor function together to acquire the desired image. The tilt angle estimation is able to be used in conjunction with the standard functionality of the camera to ensure that the image has a proper configuration.

Figure 3:
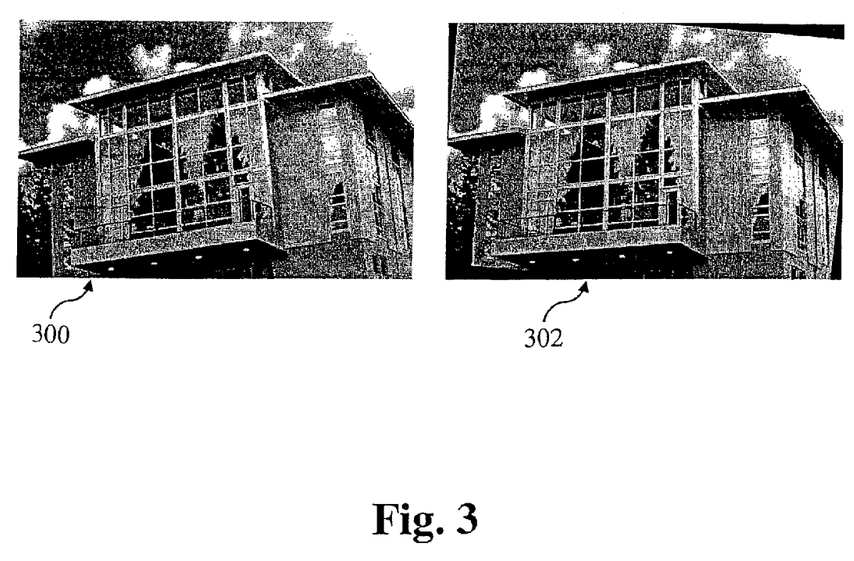
FIG. 3 shows exemplary before and after images with tilt correction according to some embodiments.

FIG. 3 shows exemplary before and after images with tilt correction according to some embodiments. A first image 300 is shown as taken by a user. The first image 300 is tilted with the building, tree and sky at a significant angle. A second image 302 is shown after being corrected for the tilt. The correction shows the building, tree and sky in a configuration that such a scene would generally appear.

To utilize tilt angle estimation, a user acquires an image such as by a digital camera, and then while the image is acquired or after the image is acquired, the image is able to be corrected using the tilt angle estimation method. For example, while an image is being acquired, the tilt angle estimation is able to take place, or after an image is acquired, a user is able to process the image and correct the tilt. In some embodiments, the camera automatically implements the tilt angle estimation, and in some embodiments, a user manually selects to implement the tilt angle estimation. In some embodiments, the tilt angle estimation is able to be done on another device such as a computer after the image is downloaded from the camera to the computer. On the computer, the tilt angle estimation is able to be done manually or automatically.

In operation, the tilt angle estimation is able to correct tilting of an image without object recognition. The tilt angle estimation computes a gradient feature, tracks line segments, estimates line segments and then estimates orientation deviation. The image is then able to be corrected based on the orientation deviation. Using this process, an image is able to be corrected so that the image is configured appropriately without an undesired tilt. The tilt angle estimation is able to correctly compensate for a tilted image so that even if the image contains images that are leaning or angled, the correct configuration will still be obtained.

In some embodiments, media able to utilize the method described herein includes but is not limited to images, videos and other data.

Embodiments of Tilt Angle Estimation

1. A method of estimating a tilt angle in an image programmed in a memory on a device comprising:
    a. computing a gradient feature;
    b. implementing line segment tracking;
    c. estimating a line segment; and
    d. estimating an orientation deviation.
2. The method of clause 1 further comprising reversely tilting the image based on the orientation deviation.
3. The method of clause 1 wherein computing the gradient feature further comprises:
    a. estimating a gradient;
    b. adaptive noise filtering;
    c. non-maximum suppression; and
    d. thinning.
4. The method of clause 1 wherein implementing line segment tracking further comprises:
    a. locating segment junctions using a neighborhood lookup table; and
    b. tracking edges between junction points.
5. The method of clause 4 wherein tracking edges between junction points further comprises:
    a. scanning a gradient image starting at a non-zero point;
    b. following an edge segment through its neighborhood;
    c. stopping tracking at a junction;
    d. assigning each segment a unique identification;
    e. iterating until all of the points are tracked; and
    f. removing any edge segment that is short or isolated.
6. The method of clause 1 wherein estimating the line segment further comprises:
    a. filtering edge length; and
    b. estimating linear segments from approximately vertical and horizontal lines.
7. The method of clause 1 wherein estimating the orientation deviation further comprises computing an optimal balance between deviations from all line segments.
8. The method of clause 1 wherein estimating the orientation deviation further comprises:
    a. image content analysis; and
    b. segment analysis.
9. The method of clause 8 wherein image content analysis further comprises filtering segments according to location in the image.
10. The method of clause 8 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.
11. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
12. A method of estimating a tilt in an image programmed in a memory on a device comprising:
    a. implementing linear structure estimation for estimating orientation preference; and
    b. changing an orientation of the image based on the linear structure estimation.
13. The method of clause 12 wherein implementing linear structure estimation further comprises:
    a. computing a gradient feature;
    b. implementing line segment tracking;
    c. estimating a line segment; and
    d. estimating an orientation deviation.
14. The method of clause 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
15. A system programmed in a memory on a device comprising:
    a. a gradient feature module configured for computing a gradient feature;
    b. a line segment tracking module operatively coupled to the gradient feature module, the line segment tracking module configured for implementing line segment tracking;
    c. a line segment estimating module operatively coupled to the line segment tracking module, the line segment estimating module configured for estimating a line segment;
    d. an orientation deviation module operatively coupled to the line segment estimating module, the orientation deviation module configured for estimating an orientation deviation; and
    e. a tilting module operatively coupled to the orientation deviation module, the tilting module configured for tilting an image based on the orientation deviation.
16. The system of clause 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
17. A device comprising:
    a. a memory for storing an application, the application configured for:
        i. computing a gradient feature;
        ii. implementing line segment tracking;
        iii. estimating a line segment; and
        iv. estimating an orientation deviation; and
    b. a processing component coupled to the memory, the processing component configured for processing the application.
18. The device of clause 17 further comprising tilting the image based on the orientation deviation.

19. The device of clause 17 wherein computing the gradient feature further comprises:
   a. estimating a gradient;
   b. adaptive noise filtering;
   c. non-maximum suppression; and
   d. thinning.
20. The device of clause 17 wherein implementing line segment tracking further comprises:
   a. locating segment junctions using a neighborhood look-up table; and
   b. tracking edges between junction points.
21. The device of clause 20 wherein tracking edges between junction points further comprises:
   a. scanning a gradient image starting at an edge point;
   b. following an edge segment through its neighborhood;
   c. stopping tracking at a junction;
   d. assigning each segment a unique identification;
   e. iterating until all of the points are tracked; and
   f. removing any edge segment that is short or isolated.
22. The device of clause 17 wherein estimating the line segment further comprises:
   a. filtering edge length; and
   b. estimating linear segments from approximately vertical and horizontal lines.
23. The device of clause 17 wherein estimating the orientation deviation further comprises computing an optimal balance between deviations from all line segments.
24. The device of clause 17 wherein estimating the orientation deviation further comprises:
   a. image content analysis; and
   b. segment analysis.
25. The device of clause 24 wherein image content analysis further comprises filtering segments according to location in the image.
26. The device of clause 24 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.
27. The device of clause 17 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
28. A camera comprising:
   a. a lens;
   b. a sensor configured for acquiring an image through the lens;
   c. a memory for storing an application, the application configured for:
      i. computing a gradient feature;
      ii. implementing line segment tracking;
      iii. estimating a line segment; and
      iv. estimating an orientation deviation; and
   d. a processing component coupled to the memory, the processing component configured for processing the application.
29. The camera of clause 28 further comprising tilting the image based on the orientation deviation.
30. The camera of clause 28 wherein computing the gradient feature further comprises:
   a. estimating a gradient;
   b. adaptive noise filtering;
   c. non-maximum suppression; and
   d. thinning.
31. The camera of clause 28 wherein implementing line segment tracking further comprises:
   a. locating segment junctions using a neighborhood look-up table; and
   b. tracking edges between junction points.
32. The camera of clause 31 wherein tracking edges between junction points further comprises:
   a. scanning a gradient image starting at a non-zero edge point;
   b. following an edge segment through its neighborhood;
   c. stopping tracking at a junction;
   d. assigning each segment a unique identification;
   e. iterating until all of the points are tracked; and
   f. removing any edge segment that is short or isolated.
33. The camera of clause 28 wherein estimating the line segment further comprises:
   a. filtering edge length; and
   b. estimating linear segments from approximately vertical and horizontal lines.
34. The camera of clause 28 wherein estimating the orientation deviation further comprises computing an optimal balance between deviations from all line segments.
35. The camera of clause 28 wherein estimating the orientation deviation further comprises:
   a. image content analysis; and
   b. segment analysis.
36. The camera of clause 35 wherein image content analysis further comprises filtering segments according to location in the image.
37. The camera of clause 35 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of estimating a tilt angle in an image programmed in a memory on a device comprising:
   a. computing a gradient feature;
   b. implementing line segment tracking including locating segment junctions using neighborhood look-up table and tracking edges between junction points;
   c. estimating a line segment; and
   d. estimating an orientation deviation.
2. The method of claim 1 further comprising reversely tilting the image based on the orientation deviation.
3. The method of claim 1 wherein computing the gradient feature further comprises:
   a. estimating a gradient;
   b. adaptive noise filtering;
   c. non-maximum suppression; and
   d. thinning.
4. The method of claim 1 wherein tracking edges between junction points further comprises:
   a. scanning a gradient image starting at a non-zero point;

b. following an edge segment through its neighborhood;
c. stopping tracking at a junction;
d. assigning each segment a unique identification;
e. iterating until all of the points are tracked; and
f. removing any edge segment that is short or isolated.

5. The method of claim 1 wherein estimating the line segment further comprises:
a. filtering edge length; and
b. estimating linear segments from approximately vertical and horizontal lines.

6. The method of claim 1 wherein estimating the orientation deviation further comprises computing an optimal balance between deviations from all line segments.

7. The method of claim 1 wherein estimating the orientation deviation further comprises:
a. image content analysis; and
b. segment analysis.

8. The method of claim 7 wherein image content analysis further comprises filtering segments according to location in the image.

9. The method of claim 7 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

10. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

11. A method of estimating a tilt in an image programmed in a memory on a device comprising:
a. implementing linear structure estimation for estimating orientation preference including:
  i. computing a gradient feature;
  ii. implementing line segment tracking including locating segment junctions using a neighborhood look-up table and tracking edges between junction points;
  iii. estimating a line segment; and
  iv. estimating an orientation deviation; and
b. changing an orientation of the image based on the linear structure estimation.

12. The method of claim 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

13. A system programmed in a memory on a device comprising:
a. a gradient feature module configured for computing a gradient feature;
b. a line segment tracking module operatively coupled to the gradient feature module, the line segment tracking module configured for implementing line segment tracking including locating segment junctions using a neighborhood look-up table and tracking edges between junction points;
c. a line segment estimating module operatively coupled to the line segment tracking module, the line segment estimating module configured for estimating a line segment;
d. an orientation deviation module operatively coupled to the line segment estimating module, the orientation deviation module configured for estimating an orientation deviation; and
e. a tilting module operatively coupled to the orientation deviation module, the tilting module configured for tilting an image based on the orientation deviation.

14. The system of claim 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

15. A device for estimating a tilt angle in an image comprising:
a. a memory for storing an application, the application configured for:
  i. computing a gradient feature;
  ii. implementing line segment tracking including locating segment junctions using a neighborhood look-up table and tracking edges between junction points;
  iii. estimating a line segment; and
  iv. estimating an orientation deviation; and
b. a processing component coupled to the memory, the processing component configured for processing the application.

16. The device of claim 15 further comprising tilting the image based on the orientation deviation.

17. The device of claim 15 wherein computing the gradient feature further comprises:
a. estimating a gradient;
b. adaptive noise filtering;
c. non-maximum suppression; and
d. thinning.

18. The device of claim 15 wherein tracking edges between junction points further comprises:
a. scanning a gradient image starting at an edge point;
b. following an edge segment through its neighborhood;
c. stopping tracking at a junction;
d. assigning each segment a unique identification;
e. iterating until all of the points are tracked; and
f. removing any edge segment that is short or isolated.

19. The device of claim 15 wherein estimating the line segment further comprises:
a. filtering edge length; and
b. estimating linear segments from approximately vertical and horizontal lines.

20. The device of claim 15 wherein estimating the orientation deviation further comprises computing an optimal balance between deviations from all line segments.

21. The device of claim 15 wherein estimating the orientation deviation further comprises:
a. image content analysis; and
b. segment analysis.

22. The device of claim 21 wherein image content analysis further comprises filtering segments according to location in the image.

23. The device of claim 21 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

24. The device of claim 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

25. A camera comprising:
   a. a lens;
   b. a sensor configured for acquiring an image through the lens;
   c. a memory for storing an application, the application configured for:
      i. computing a gradient feature;
      ii. implementing line segment tracking including locating segment junctions using a neighborhood look-up table and tracking edges between junction points;
      iii. estimating a line segment; and
      iv. estimating an orientation deviation; and
   d. a processing component coupled to the memory, the processing component configured for processing the application.

26. The camera of claim 25 further comprising tilting the image based on the orientation deviation.

27. The camera of claim 25 wherein computing the gradient feature further comprises:
   a. estimating a gradient;
   b. adaptive noise filtering;
   c. non-maximum suppression; and
   d. thinning.

28. The camera of claim 25 wherein tracking edges between junction points further comprises:
   a. scanning a gradient image starting at a non-zero edge point;
   b. following an edge segment through its neighborhood;
   c. stopping tracking at a junction;
   d. assigning each segment a unique identification;
   e. iterating until all of the points are tracked; and
   f. removing any edge segment that is short or isolated.

29. The camera of claim 25 wherein estimating the line segment further comprises:
   a. filtering edge length; and
   b. estimating linear segments from approximately vertical and horizontal lines.

30. The camera of claim 25 wherein estimating the orientation deviation further comprises computing an optimal balance between deviations from all line segments.

31. The camera of claim 25 wherein estimating the orientation deviation further comprises:
   a. image content analysis; and
   b. segment analysis.

32. The camera of claim 31 wherein image content analysis further comprises filtering segments according to location in the image.

33. The camera of claim 31 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

* * * * *